July 4, 1972     L. J. WINDECKER     3,674,585
METHOD OF MAKING AN AIRCRAFT WING STRUCTURE
Filed Oct. 7, 1969
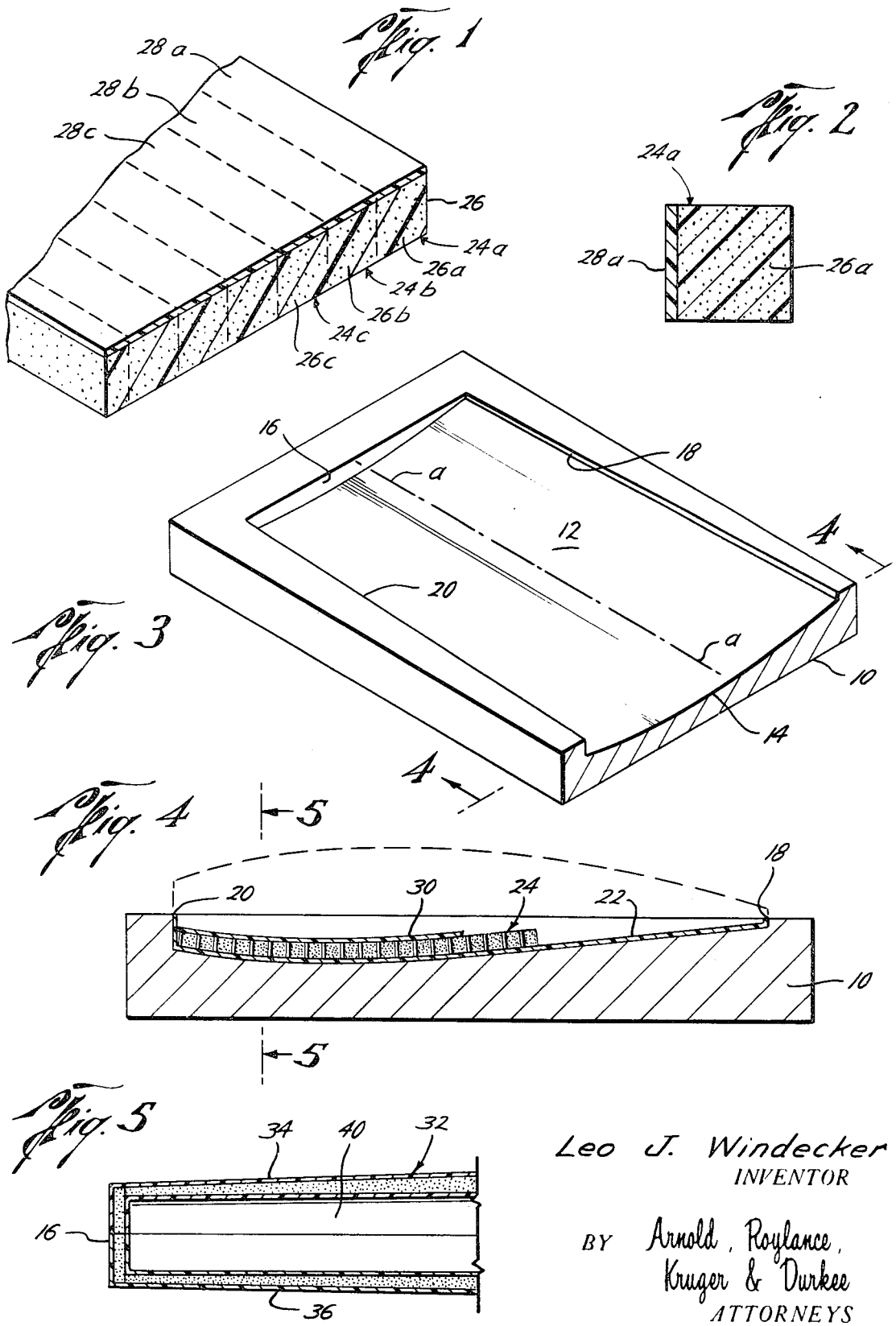
Leo J. Windecker
INVENTOR
BY Arnold, Roylance,
Kruger & Durkee
ATTORNEYS

United States Patent Office 3,674,585
Patented July 4, 1972

3,674,585
METHOD OF MAKING AN AIRCRAFT WING STRUCTURE
Leo J. Windecker, Midland, Tex., assignor to Windecker Research, Inc., Midland, Tex.
Filed Oct. 7, 1969, Ser. No. 864,425
Int. Cl. B32b 31/00
U.S. Cl. 156—182                   5 Claims

ABSTRACT OF THE DISCLOSURE

A generally hollow aircraft wing structure is provided, the wall of which includes an outer skin, an intermediate layer including foam material, and a strengthening layer of glass fibrous material impregnated with synthetic resinous material. A method of constructing the wing structure is provided which includes providing a suitably shaped mold for half the wing structure, forming the skin in the mold, bonding foam strips to the skin, and thence bonding to the foam strips strengthening glass fibrous sheets.

BACKGROUND OF THE INVENTION

This invention relates to aircraft wing construction. More particularly, it relates to a lightweight, high-strength wing construction which exhibits both excellent tensile strength and excellent compressive strength.

It has long been a desire in the aircraft industry to provide parts of the aircraft structure, including wings, fuselage, etc., having as little weight as possible. The advantage of light weight in an aircraft is of course quite apparent, it being a recognized principle that, other things being equal, heavier objects are more difficult to fly than lighter ones. The use of most lightweight structures of this nature has been precluded by the fact that structures such as aircraft wings must be quite strong and must be able to withstand great stress. Complicating the strength problem is the fact that an aircraft wing must exhibit both good tensile strength and good compressive strength. Many materials are known which have good tensile strength qualities but poor compressive strength qualities, or vice versa. Combining good tensile strength with good compressive strength, while still maintaining light weight, has been a goal of the industry which has never been satisfactorily fulfilled. Further, it is quite important that an aircraft wing exhibit good flexural strength qualities, and it is desirable that such flexural strength be controlled so that greater flex will occur at the tip end of the wing.

The present invention provides a structure which exhibits great tensile and compressive strength, and yet which is lighter in weight than comparable prior art structures.

Another problem in this area has been that, in the past, it has been difficult to readily shape wings in various desired configurations. For example, it is presently not feasible to shape a wing in elliptical configuration. The present invention provides a wing structure, and method of making such structure, which may be readily formed into any desired configuration including an elliptical configuration.

Still another problem facing the aircraft industry has been in the area of aerodynamic efficiency. Most structures of this type in use today have surface nonconformities which create drag and turbulent flow of air therearound. It has long been recognized that aircraft efficiency is greatly improved by aerodynamically smooth surfaces. This invention provides a wing structure having such surfaces.

In addition to the above-noted advantages of the invention, which are each directed to the solving of long-recognized industry problems, the present invention provides a wing construction having several more or less unexpected advantages. One such advantage is that the wing construction of the invention provides for facility of repair. Further, and quite importantly, the construtcion lends itself to ease of redesign and modification to gain greater tensile or compressive strength, as desired. Still further, the construction of this invention allows valuable extra space for storage of fuel, and facilitates the stringing of the aircraft controls.

In these many and important respects, the invention solves perplexing problems which have long existed in the aircraft industry, and provides in a single structure many distinct and varying advantageous features.

The method of the invention is relatively quick and quite economical, requiring a minimum of expensive labor.

SUMMARY OF THE INVENTION

Broadly, the present invention provides a substantially hollow wing structure. The wing structure comprises a hollow mid-portion, and a wall portion which is substantially uniform around the periphery of the wing. The wall of the wing is comprised of an outer skin portion, an intermediate portion of foam material, and an inner layer of glass fibrous material.

The skin portion of the wall is constructed from an outer layer or layers suitable for forming a smooth surface having excellent optical and aerodynamic properties. The major structural portion of the skin is comprised of successive layers of epoxy resin-glass fiber sheets which lend to the skin great tensile strength.

The intermediate foam layer desirably includes epoxy resin-glass fiber strengthening segments, and the inner layer of glass fibrous material is desirably constructed of the same type of epoxy resin-glass fiber sheets.

The wing structure according to the invention is constructed by a method which includes providing a suitable mold for one-half the wing structure, forming and curing the skin in the mold, thence adding atop the skin in the mold, a plurality of strips of foam material of the type described above. Finally, the inner layer of glass fibrous material is added, and the wing half is released from the mold and joined to its mating half.

BRIEF DESCRIPTION OF THE DRAWINGS

The invention will be described in terms of a particularly preferred embodiment which represents the best mode of the invention as known to the inventor at the time of this application, this embodiment being illustrated in the accompanying drawings which form a part of this application and wherein:

FIG. 1 is a cross-sectional view of a foam and glass fiber sheet from which the stringers constructed in accordance with this invention are made, the dotted lines indicating the various segments after such sheet has been cut in accordance with the invention;

FIG. 2 is a cross-sectional view of a stringer constructed from the sheet of FIG. 1;

FIG. 3 is a pictorial view of a mold of the type suitable for use in connection with this invention;

FIG. 4 is a view taken along the line 4—4 of FIG. 3; and,

FIG. 5 is a cross-sectional view of a wing constructed in accordance with the invention.

DETAILED DESCRIPTION OF PREFERRED EMBODIMENT

The preferred embodiment illustrated will now be described in greater detail.

The substantially hollow wing structure 32 provided by the invention includes an upper wall 34 and a lower wall 36 which are substantially similar, and a substantially hollow mid-portion 40. Each wall includes an outer skin portion 22, an intermediate layer 24 comprised of foam material, and an inner layer 30 of strengthening glass fibrous material. This embodiment of the invention is perhaps best described in connection with the method of construction utilized.

In accordance with this method, the intermediate foam layer 24 is constructed of elongate foam-glass fiber "stringers" such as the stringer 24a shown in FIG. 2, which are made in the following manner:

First, a sheet 26 of suitable foam material is provided, the sheet desirably having a length approximately as great as the wing to be constructed, and a thickness dimension of about one inch. For example, a sheet about ten feet long, four feet wide and one inch thick may be employed. Any suitable foam material may be employed, for example rigid, closed-cell polyurethane or polystyrene foam. For high performance wings which must withstand great speeds (for example, for use in jet aircraft), very high density foam material is preferred. One particular foam material which is suitable for use in this invention is the settable, flexible foamed resins which are disclosed in my U.S. Pat. No. 3,269,887.

The foam sheet 26 thus provided is placed on a flat surface with its thickness dimension oriented vertically as in FIG. 1. Onto the top of the sheet as thus disposed is placed impregnated reinforcing fibrous material such as glass cloth in a plurality of layers 28. Desirably, a first layer of glass cloth, which may be either a woven or nonwoven (such as that available from Windecker Supply Company under the trademark "NUF") glass cloth of any suitable density (e.g. 9 ounces per square yard), impregnated with a suitable resin such as a curing epoxy resin in a well-known manner, is provided. The term epoxy resin as used herein includes any resin containing two or more oxirane oxygen groups which can be crosslinked to produce a solid thermoset polymer. Epoxy resins which may be used include the diglycidyl ethers of diphenols, the epoxidized novolaks, epoxidized polyglycols, epoxidized vegetable oils, and the like, as well as mixtures thereof. The diglycidyl ether of bisphenol A is particularly suitable for producing articles having good optical qualities, and is especially desirable for use in this invention.

Specifically, one example of a suitable resin is that sold under the trademark D.E.R. 331 by the Dow Chemical Company.

Any of the common epoxy curing agents may be used with these molding resins. Anhydrides such as phthalic anhydride, polyamines such as diethylene triamine as well as catalytic agents such as $BF_3$ with monoethylamine may be combined with the molding resin to effect the cure. Specifically, about 9 parts per hundred of Dow Chemical's "DETA," a diethylene triamine, has been found useful herein. The mixtures of the molding resin and curing agent are designated herein as curing epoxy resins.

This first layer of glass cloth, having been impregnated with resin, is then placed atop the sheet of foam material and thereby bonded thereto. Desirably, a second ply of glass cloth is impregnated in the same manner and placed on top of the first ply, in a direction perpendicular to the first ply. A third and fourth ply may be added in the same manner, the warp strands of the third ply desirably being oriented at an angle of 45° with respect to the second ply, and the fourth ply desirably being oriented perpendicular to the second ply.

The resin material is then allowed to cure so that a firm bond may be achieved. Curing may be achieved by heating the material to about 100° C. for a period of about two hours. It may be desirable to cure under vacuum with the aid of release and bleeder cloths in the manner described below in connection with the method for lay-up of the skin.

Any suitable number of plies of glass cloth may be adhered to the foam strip in the manner indicated above, but it is generally preferred that the thickness of the glass cloth layer (which layer includes any desired number of individual plies of cloth) not be more than about 10% as great as the thickness of the foam sheet. In this example, therefore, the total thickness of the multiple plies of glass cloth would not exceed about one-tenth inch.

The foam-glass cloth composite thus formed is then cut into long thin strips 24a, 24b, 24c, etc. which are desirably slightly tapered in a manner such that the walls 34, 36 may be slightly thicker at the inboard end (see FIG. 5) than at the outboard or tip end 16. Desirably, a number of the strips are cut about one inch in width, and other strips are cut about two inches wide. The strips thus formed, which may be referred to for convenience of explanation, as "stringers," thus consist of a foam layer 26a and a reinforcing glass fiber segment 28a, the foam layer being much thicker than the fiber segment. Each stringer is of relatively small width and thickness, and relatively great length, and is useful in constructing the wing structure in accordance with this invention.

The method of constructing the wing structures in accordance with this embodiment of the invention is as follows:

A suitable mold 10 is provided which has a cavity 12 of a size and shape desired for a wing half (upper portion 32a of the wing structure, or mating lower portion 32b of the wing structure) the mold having a first end 14 at the point where the wing will be affixed to the aircraft fuselage, and a tip end 16 disposed at the opposite end of a central longitudinal axis a—a. One end 20 of the mold corresponds to the leading edge of the wing, and will be so denoted. The opposite edge 18 corresponds to the trailing edge of the wing.

The skin 22, or surface portion of the wing structure, is prepared by first disposing into the mold a continuous film of a nonadhering mold release agent. Any suitable agent of this type may be used, for example a wax or polyvinyl alcohol.

An acrylic lacquer is then sprayed or painted into the mold to form a continuous film on the mold release agent. Any suitable acrylic lacquer might be employed, including copolymers of methylmethacrylate, a pure acrylic resin, or a nitro cellulose acrylic. More specifically, the "Lucite" brand available from E. I. du Pont de Nemours Co. may be used. The acrylic lacquer layer is allowed to dry for a period of approximately 30 minutes to one hour.

After the acrylic lacquer layer has been allowed to dry in this manner, a "transition" coating is then applied into the mold. This transition coating is desirably comprised of about 50 percent by weight of the same acrylic lacquer, and about 50 percent of a synthetic polymeric material such as a curing epoxy resin of any suitable type; for example, those resins mentioned above in connection with the preparation of the stringers are useful. The transition coat is desirably dried at about 140° F. for about one hour, resulting in at least partial curing of the epoxy resin.

A layer of synthetic polymeric material such as curing epoxy resin is then applied, the polymeric material used preferably being the same type as utilized in the transition layer, i.e., in this example, epoxy resin. The epoxy resin utilized desirably includes about one percent carbon black. This epoxy layer is allowed to cure for about one hour at 140° F.

It will generally be desired to produce a colored end product, and such a product may be readily produced by adding coloring agents or pigments to either the acrylic, the epoxy resin, or both. The surfaces of articles produced according to this invention also allow good secondary bonding to or painting of their surfaces without any additional treatment.

Sheets of impregnated reinforcing fibrous material such as glass fiber are then added to the surface thus formed in the mold in much the same manner as such sheets are used in connection with the preparation of the stringers discussed above. Desirably, a first layer of woven glass cloth is impregnated (as for example with the same type of curing epoxy resin discussed above), and this layer is laid in the mold with the warp strands extending axially in the direction of the wing. A second ply of 9-oz. impregnated nonwoven unidirectional fiber is then laid, with the strands being directed at an angle of about 45° with respect to the warp strands of the first layer. A third ply of impregnated 9-oz. nonwoven unidirectional fiber is laid with the strands parallel to the warp strands of the first layer. A fourth layer of impregnated 9-oz. nonwoven unidirectional fiber is then laid parallel to the third layer, but this ply is laid only from the first end 14 of the mold to the approximate mid-point thereof. A fifth ply is laid in the same manner from the first end 14 of the mold to a point approximately one-quarter distant to the tip end 16 of the mold. Additional tensile strength may be gained by adding further plies, either completely along the axial distance of the mold, or else extending from the first end of the mold toward the tip end, but terminating short of the tip end.

It will be recalled that the above description is rather specific, being directed as it is to this preferred embodiment of the invention. It will be apparent to those skilled in the art that other types and weights reinforcing fibrous sheets, various orientations of the sheets, as well as various numbers of plies, may be utilized.

Following lay-up of the glass sheets in this manner, the resin used to impregnate said sheets is cured under vacuum. This is desirably done by adding to the mold over the glass sheets a release cloth and then a bleeder cloth. The porous release cloth (e.g., a sheet of polytetrafluoroethylene, or "Teflon") is used solely in order that the curing epoxy resin will not cause adhesion of the bleeder cloth to the glass sheets in the mold.

The bleeder cloth, which may desirably be another sheet of glass fiber, is one which, under vacuum, will hold firmly against the glass fiber layers in the mold but which will permit resin to flow therethrough. When the composite is then subjected to vacuum, excess resin is released through the bleeder cloth so that the optimum glass-resin ratio is achieved, and the surface integrity of the wing structure is maintained since air bubbles are dissipated, thus freeing the surface of voids and wrinkles.

The skin is cured in this manner for about three hours at about 140° F.

Onto the skin thus formed, is placed a plurality of the stringers 24a, 24b, etc. prepared as discussed above, in side-by-side relation. These stringers are laid lengthwise in the mold, axially therealong. Desirably, a first stringer 24a one inch wide is laid about six inches past the leading edge 20 of the mold, the stringer 24a oriented so that the glass fiber segment 28a thereof is disposed substantially perpendicular to the skin 22 (i.e., substantially vertically disposed). The edge of the stringer opposite the leading edge and the lower surface of the stringer are each covered with a suitable bonding agent, desirably a curing epoxy resin of the type described above, so that the stringer may be readily bonded to a second stringer which is placed in the mold adjacent the first stringer, and to the glass cloth of the skin immediately beneath the stringer in the mold. (Instead of having to coat the lower surface of each of the stringers with adhesive, it will generally be preferred, if the stringers are to be placed in the mold at about the same time, to coat the upper surface of the glass cloth skin with adhesive.)

In the same manner, a second stringer 24b is added, the second stringer desirably being juxtaposed against the first stringer throughout its complete length. As many stringers may be added as desired, it having been found desirable to utilize stringers of this type all the way across the skin to within a few inches of the trailing edge. It has been found desirable to employ approximately a dozen stringers of the one-inch size, and then use stringers of the two-inch size for the remainder of the wing structure.

After the stringers have been laid up across the complete width of the wing mold, the resin bonding the stringers together and bonding the stringers to the glass cloth layers of the skin surface is allowed to cure for about three hours at about 140° F.

The resultant intermediate foam layer 24 is substantially parallel to the skin 22, with the reinforcing segments 28 being substantially perpendicular to the skin.

Following the firm adhesion of the stringers to the skin, a reinforcing fibrous layer comprised for example of additional sheets of glass cloth may be added atop the stringers to form an inner reinforcing layer 30 generally parallel to skin 22. This is desirably done in the same manner as the laying up of the glass cloth layers of the skin. In other words, multiple layers of glass cloth are impregnated with curing epoxy resin, and successively laid up atop the stringers, the glass strands in successive layers being oriented in different directions.

Likewise, the resin in this fibrous layer is allowed to cure in the same manner as earlier indicated.

After the resin of this fibrous layer has cured for about three hours, the wing structure is released from the mold and joined to its mating half in any suitable manner, as by use of bolts. Suitable spars which may be oriented such that they would appear as vertical lines in FIG. 4 if shown, or other features such as a molded wing tip instead of the tip end structure illustrated at 16 in FIG. 5 may be included in the wing if desired, and a suitably shaped cap may if desired be affixed along the perimeter of the wing where the two halves are bonded together.

It is seen from the above discussion that a wing structure is provided which has the many advantages discussed above. Most importantly, the wing provided is of light weight. Whereas a wing of a certain size exhibiting the necessary strength qualities and constructed of foam material extending throughout the surface of the wing (for example, see my U.S. Pat. No. 3,396,922) will weigh on the order of 200 pounds, and a metal wing of like size, such as that in common use today, will weigh on the order of 150–175 pounds, a similarly-sized wing constructed in accordance with this invention will weigh only about 125 pounds. The difference is substantial; where aircraft structures are concerned, the difference is phenomenal.

The hollow 40 of the wing 32 provided by the invention provides fuel (or other) storage capacity, and facility to string aircraft controls, not found in present structures.

The smooth surface which has no ribs, no rivets, no screws, etc., is aerodynamically smooth and flawless. Hence, less power is required to pull the wing structure of this invention through the air than with prior art structures. The optical and esthetic qualities of the wing surface are excellent; in fact, the wing surface has an appearance much like polished marble.

Construction of a mold 10 with a cavity 12 in any desired shape allows construction of a completed wing structure in any such shape. This advantage is not available in similarly operable prior art structures.

Perhaps most importantly, the unique construction of the wing structure in accordance with this invention provides not only for light weight and high strength, but also for the combination in a single structure of excellent qualities of each flexural strength, tensile strength and compressive strength. Further, either flexural strength, tensile strength or compressive strength may be readily and easily improved by slight alterations in the manufacturing technique. For example, if additional tensile strength is desired, more layers of impregnated glass cloth can be employed, either in the skin layer 22 or the inner layer 30, or both. Meanwhile, if greater compressive strength is needed, more segments of foam blocks can be employed. Either such alteration in the construction technique is readily made and requires no additional materials.

It is again emphasized that the discussion above has been in terms of a particularly preferred embodiment. Various modifications in the structures and methods given by way of illustration herein might be indulged without departing from the scope of the invention. For example, even though it has been preferred to use a foam of synthetic polyymeric material such as polyurethane or polystyrene, other foams could be utilized; even a metal foam such as foamed aluminum might be employed. And even though a closed-cell foam is preferred in most applications, certain open-cell foams may be acceptable in certain contexts of use. The sequence of steps set forth herein might be varied in some particulars while the same result is achieved, and of course certain latitude is possible in the selection of materials such as types of glass fiber and selection of resins, etc.

Having thus described my invention in terms of this preferred embodiment and certain alternatives, what I claim is:

1. A method of constructing an aircraft wing structure which comprises:
   providing a mold having a cavity therein of a shape and size of a wing half;
   forming an outer skin portion in said cavity, by applying a coating of synthetic polymeric material over the entire surface of said cavity, and impregnating a plurality of sheets of reinforcing fibrous material with a synthetic polymeric material, and applying said sheets one by one to said coating;
   forming an intermediate layer by laying elongate foam strips onto said skin in side-by-side relation, each said strip having along one edge thereof a segment of reinforcing fibrous material oriented generally perpendicular to said skin portion;
   forming a reinforcing layer by successively laying up sheets of reinforcing fibrous material impregnated with synthetic polymeric material to bond said sheets to one another, and firmly securing said reinforcing layer to said intermediate layer, said outer skin, intermediate layer, and reinforcing layer to form the wall of a wing half; and
   removing said wing half from said mold and securing it to a mating wing half to form said aircraft wing structure.

2. A method in accordance with claim 1, wherein said synthetic polymeric material is a curing epoxy resin.

3. A method in accordance with claim 1, wherein said reinforcing fibrous material comprises sheets of glass fiber.

4. A method of constructing an aircraft wing structure which comprises:
   providing a mold having a cavity therein of a shape and size of a wing half;
   coating the surface of said cavity with a mold release agent;
   forming an outer skin portion in said cavity by
      applying a first coating of acrylic lacquer over said mold release agent,
      applying a second coating comprising a mixture of acrylic lacquer and curing epoxy resin material,
      applying a third coating of epoxy resin material, and,
      impregnating a plurality of sheets of glass fibrous material with a curing epoxy resin, and applying said fibrous sheets one by one to the third coating in said cavity, bonding said fibrous sheets to said coating;
   forming an intermediate layer by laying elongate foam strips onto said skin in side-by-side relation, each said strip having along one edge thereof a segment of glass fibrous material oriented generally perpendicular to said skin portion;
   forming a reinforcing layer by successively laying up sheets of glass fibrous material impregnated with epoxy resin, to bond said sheets to one another and firmly securing said reinforcing layer to said intermediate layer, said outer skin, intermediate layer and reinforcing layer to form the wall of a wing half; and,
   removing said wing half from said mold and securing it to a mating wing half to form said aircraft wing structure.

5. A method in accordance with claim 4, wherein the acrylic lacquer and epoxy resin in said second coating are applied in approximately equal parts by weight.

References Cited

UNITED STATES PATENTS

| | | | |
|---|---|---|---|
| 3,287,754 | 11/1966 | Price et al. | 156—245 X |
| 3,437,547 | 4/1969 | Sullivan | 156—245 X |

CARL D. QUARFORTH, Primary Examiner

S. J. LECHER, JR., Assistant Examiner

U.S. Cl. X.R.

156—289, 245, 330